(12) United States Patent
Mori et al.

(10) Patent No.: US 7,270,776 B2
(45) Date of Patent: Sep. 18, 2007

(54) RESIN COMPOSITION FOR FORMING THERMISTOR BODY, AND THERMISTOR

(75) Inventors: Yukie Mori, Tokyo (JP); Satoshi Shirai, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/167,174

(22) Filed: Jun. 28, 2005

(65) Prior Publication Data
US 2006/0022790 A1 Feb. 2, 2006

(30) Foreign Application Priority Data
Jun. 29, 2004 (JP) .......................... P2004-192026

(51) Int. Cl.
*H01B 1/06* (2006.01)
*H01C 7/13* (2006.01)

(52) U.S. Cl. .................... 252/511; 338/22 R
(58) Field of Classification Search ............... 252/500
See application file for complete search history.

(56) References Cited

U.S. PATENT DOCUMENTS

| | | | | |
|---|---|---|---|---|
| 4,696,764 A | * | 9/1987 | Yamazaki ............... | 252/503 |
| 4,966,729 A | | 10/1990 | Carmona et al. | |
| 5,250,228 A | * | 10/1993 | Baigrie et al. ........... | 252/511 |
| 5,416,462 A | | 5/1995 | Demarmels et al. | |
| 5,916,486 A | | 6/1999 | Angelopoulos et al. | |
| 5,935,372 A | | 8/1999 | Rojstaczer et al. | |
| 5,968,419 A | * | 10/1999 | Sadhir et al. ............. | 252/512 |
| 6,139,777 A | * | 10/2000 | Omoya et al. ............ | 252/500 |
| 6,362,722 B1 | | 3/2002 | Cole et al. | |
| 6,375,867 B1 | * | 4/2002 | Smith et al. ............. | 252/511 |
| 2006/0097231 A1 | | 5/2006 | Mori | |

FOREIGN PATENT DOCUMENTS

| | | |
|---|---|---|
| EP | 0 896 344 A2 | 2/1999 |
| GB | 1 509 344 | 5/1978 |
| JP | A 05-198403 | 8/1993 |
| JP | A-11-126706 | 5/1999 |
| JP | 2000-200704 | 7/2000 |
| JP | 2000-223303 | 8/2000 |
| JP | 3101047 B2 | 8/2000 |
| JP | 3101048 B2 | 8/2000 |
| JP | 2005-294545 | 10/2005 |
| WO | WO 03/105160 | 12/2003 |
| WO | WO 2004/029720 | 4/2004 |
| WO | WO 2004/086421 | 10/2004 |

OTHER PUBLICATIONS

Echte, Adolf, "Handbuch der technischen Polymerchemie" 1993, pp. 656-658.

* cited by examiner

*Primary Examiner*—Douglas McGinty
*Assistant Examiner*—Jaison Thomas
(74) *Attorney, Agent, or Firm*—Oliff & Berridge, PLC

(57) ABSTRACT

This invention relates to a thermistor comprising a pair of opposite electrodes and a thermistor body positioned between the pair of electrodes, wherein the thermistor body consists of a cured product of the resin composition comprising an epoxy resin including a cycloaliphatic epoxy resin, a curing agent and electrically conducting particles.

6 Claims, 1 Drawing Sheet

RESIN COMPOSITION FOR FORMING THERMISTOR BODY, AND THERMISTOR

BACKGROUND OF THE INVENTION

1. Field of the Invention

This invention relates to a resin composition for forming a thermistor body, and a thermistor.

2. Related Background of the Invention

Thermistors employing a material comprising a polymer layer and electrically conducting particles dispersed therein as a thermistor body, are generally known as organic thermistors or the like. Especially, thermistors having a PTC (positive temperature coefficient) wherein the resistance value increases sharply with temperature, are sometimes referred to as positive organic thermistors. These thermistors are used in devices such as overcurrent protection elements, heating protection elements, self-regulating heating elements and temperature sensors. These devices are required to have the characteristics that the room temperature resistance is sufficiently small, the change ratio of resistance value when the device is heated from room temperature to high temperature (change ratio of resistance value) is sufficiently large, and the variation of resistance value when the device is subjected to thermal histories such as heating and cooling (difference between the initial room temperature resistance value and room temperature resistance value after being subjected to thermal histories) is small. Hence, thermistors are required which can simultaneously satisfy these conditions to a high degree.

Conventionally, thermoplastic resins were widely used as the polymer layer forming the thermistor body of the thermistor. However, if a thermoplastic resin is used, cross-linking treatment or non-flammability treatment is required to increase heat resistance, and the manufacture of the thermistor body became complicated.

Thus, in order to facilitate manufacture with simple process, the use of a thermosetting resin as the polymer layer forming the thermistor body has been considered. For example, as a thermistor using a thermosetting resin composition, it has been proposed to disperse a fibrous electrically conducting substance in a thermosetting resin (e.g., U.S. Pat. No. 4,966,729), to disperse electrically conducting particles having spike-like projections in a thermosetting resin (e.g., Japanese Patent Publication No. 3101047) or disperse electrically conducting particles having spike-like projections and electrically conducting short fibers in a thermosetting resin (e.g., Japanese Patent Publication No. 3101048).

SUMMARY OF TEE INVENTION

However, conventional thermistors including those described in U.S. Pat. No. 4,966,729, it was difficult to reduce the room temperature resistance while maintaining the sufficiently large change ratio of resistance value.

In the case of the thermistors described in Japanese Patent Nos. 3101047 or 3101048, it was found that when it was attempted to satisfy the duel conditions of low room temperature resistance and large change ratio of resistance value to a sufficient degree for practical use, the resistance value variation after heat treatment became large, and operating stability was impaired.

It is therefore an object of this invention, which was conceived in view of the aforesaid problems, to provide a thermistor having a low room temperature resistance and large change ratio of resistance value, as well as superior operating stability, and to provide a resin composition for forming a thermistor body by which the thermistor can be obtained.

To resolve the aforesaid problems, a resin composition for forming a thermistor body according to the invention comprises an epoxy resin including a cycloaliphatic epoxy resin, a curing agent and electrically conducting particles.

In the thermistor body formed using this resin composition, electrically conducting particles are dispersed in the polymer layer derived from the epoxy resin including a cycloaliphatic epoxy resin. Hence, the thermistor comprising this thermistor body not only has a low room temperature resistance and large change ratio of resistance value, while having superior operating stability. It has been suggested by the inventors that these effects are due to the fact that the expansion coefficient and flexibility of the polymer layer forming the thermistor body are larger than those of conventional art due to the use of a cycloaliphatic epoxy resin.

If the expansion coefficient of the polymer layer wherein the electrically conducting particles are dispersed is large, it may be expected that the distance between the electrically conducting particles and their contact frequency will vary largely with temperature variation. It is conceivable that this action causes the change ratio of resistance value with temperature variation of the thermistor body to vary largely. Also, if the flexibility of the polymer layer is large, when expansion and contract occur repeatedly due to heating and cooling, the occurrence of fine cracks in the polymer layer and peeling at the interface between the polymer layer and electrically conducting particles may be suppressed. If there are a large number of cracks and peeling is severe, the room temperature resistance of the thermistor body may increase, and its change ratio of resistance value may decrease.

The cycloaliphatic epoxy resin is an epoxy resin containing a cycloaliphatic group which is a cyclic aliphatic hydrocarbon group, and two or more epoxy groups. Herein, the cycloaliphatic group may be a group other than an epoxy group mainly consisting a saturated hydrocarbon. It will be assumed that the ring-forming atoms may also comprise heteroatoms such as oxygen, nitrogen and sulphur, and may partially contain unsaturated bonds. Also, the cycloaliphatic group may contain substituent groups. In particular, the cycloaliphatic group contained in the cycloaliphatic epoxy resin is preferably a saturated cycloaliphatic hydrocarbon group, and this cycloaliphatic hydrocarbon group is more preferably a group containing a cyclohexane ring or cyclopentane ring.

The curing agent in the resin composition preferably contains an acid anhydride. By suitably combining this acid anhydride with the cycloaliphatic epoxy resin, the effects of the invention are particularly enhanced.

The thermistor of the invention comprises a pair of opposite electrodes and a thermistor body, this thermistor body consists of the cured product of the aforesaid resin composition for forming a thermistor body.

The thermistor of the invention comprises the cured product of the aforesaid resin composition for forming a thermistor body as a thermistor body, hence it has a low room temperature resistance, a large change ratio of resistance value and superior operating stability.

DESCRIPTION OF THE PREFERRED EMBODIMENTS

Figure 1:
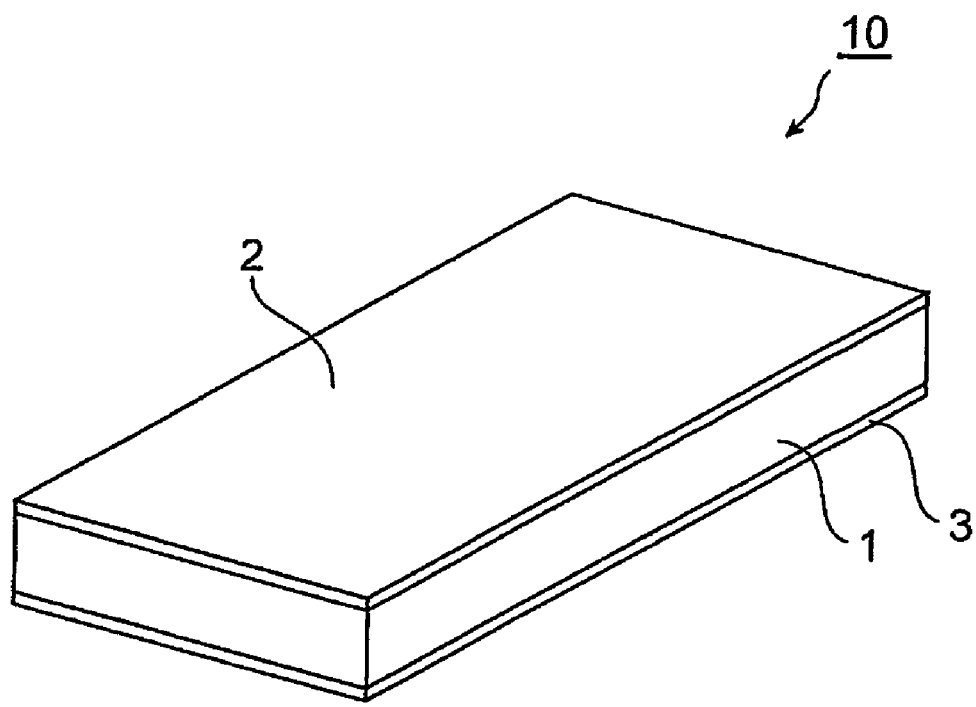
FIG. 1 is a perspective view schematically showing an embodiment of a thermistor according to the invention.

The invention will now be described in detail referring to specific embodiments, with the understanding that the invention is not limited to these embodiments.

FIG. 1 is a perspective view schematically showing a preferred embodiment of the thermistor according to the invention. A thermistor 10 shown in FIG. 1 comprises a pair of electrodes 2, 3 disposed opposite each other, and a thermistor body 1 having positive resistance-temperature characteristics interposed between the electrodes 2 and 3, and in intimate contact therewith. The whole assembly has a substantially rectangular parallelepiped shape. In the thermistor 10, a lead (not shown) which is electrically connected to the electrode 2, and a lead (not shown) which is electrically connected to the electrode 3, may also be provided if required. This thermistor 10 may be used for an overcurrent protection element, heating protection element, self-regulating heating element, temperature sensor or the like.

The electrodes 2, 3 may be formed of an electrically conducting material which functions as a thermistor electrode. The material forming the electrodes 2, 3 is preferably a metal such as nickel, silver, gold or aluminum, or carbon. The thickness of the electrode is preferably 1 to 100 μm, but from the viewpoint of lightweightness of the thermistor, it is more preferably 1 to 50 μm. The shape and material of the leads are not particularly limited, provided that they have electrically conducting properties which can discharge electrons from the electrodes 2, 3 to the outside, and vice versa.

The thermistor body 1 is the cured product of the resin composition of the invention (hereafter, may be referred to as "resin composition"), comprising an epoxy resin including a cycloaliphatic epoxy resin, a curing agent and electrically conducting particles. In this thermistor body 1, the electrically conducting particles are dispersed in a polymer layer which has a crosslinked structure mainly derived from the epoxy resin and the curing agent. The positive resistance-temperature characteristics of this thermistor body 1 are considered to be due to the fact that the conducting efficiency of the electrical paths formed between the electrically conductive particles varies due to temperature variation.

The cured product which forms the thermistor body 1, is formed by heating and curing the aforesaid resin composition. This resin composition is obtained by mixing the component ingredients described below by the usual methods.

The cycloaliphatic epoxy resin is an epoxy resin comprising a cycloaliphatic group, and two or more epoxy groups. This cycloaliphatic epoxy resin preferably contains only a cycloaliphatic group as a cyclic group other than the epoxy resin group, but it may additionally contain an aromatic group provided that the effect of the invention is not remarkably impaired. Specifically, if the cycloaliphatic epoxy resin does contain an aromatic group, the number thereof is preferably less than the number of cycloaliphatic groups.

Herein, the cycloaliphatic group is preferably a cyclic group mainly formed from a saturated hydrocarbon, but it will be assumed that the ring-forming atoms may also comprise heteroatoms such as oxygen, nitrogen and sulphur, and may partially contain unsaturated bonds. The cycloaliphatic group may contain a substituent group. To improve the flexibility of the cured product, this cycloaliphatic group is preferably a group containing a saturated cycloaliphatic hydrocarbon group such as a cyclohexane, cyclopentane or dicyclopentadiene group, but more preferably, it contains either or both a cyclohexane and cyclopentane group.

To further enhance the properties required to the thermistor (heat resistance, operational stability etc.), the cycloaliphatic epoxy resin preferably contains two epoxy groups. Further, the epoxy groups in the cycloaliphatic epoxy resin are preferably introduced as glycidyl ether groups.

Specific examples of the cycloaliphatic epoxy resin are the compounds having the following chemical formulae (1a), (1b), (1c), (2a), (2b) or (3). These may be used alone, or two or more may be used together. Among these, the cycloaliphatic epoxy resins expressed by the formulae (1a), (1b) or (1c) are particularly preferred.

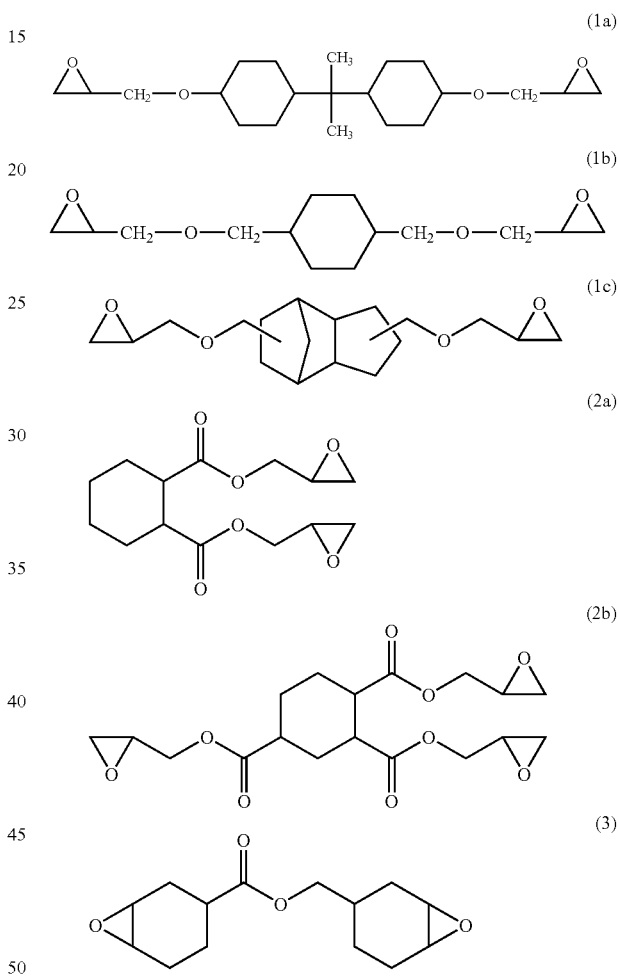

The cycloaliphatic epoxy resin may be obtained by a method known in the art, e.g., hydrogen reduction of the aromatic ring of an epoxy resin having an aromatic ring, such as a bisphenol A epoxy resin or bisphenol F epoxy resin, or oxidation and epoxidation of the unsaturated bond of a cycloolefin ring.

The epoxy resin in the resin composition may contain an epoxy resin other than the aforesaid cycloaliphatic epoxy resin. The proportion of the epoxy resin other than the cycloaliphatic epoxy resin is preferably 0 to 97 mass %, but more preferably 0 to 50 mass %, of total epoxy resin.

The epoxy resin other than the cycloaliphatic epoxy resin may be for example a polyglycidyl ether obtained by reaction of a polyhydric phenol such as bisphenol A, bisphenol F, bisphenol AD, catechol, resorcinol and tetra-methyl biphenyl, or a polyhydric alcohol such as a glycerin, polyethylene glycol and alkylene oxide adduct of bisphenol compounds, with epichlorohydrin; a glycidyl ether ester obtained by reaction of a hydroxycarboxylic acid such as p-hydroxybenzoic acid and β-hydroxy naphthoic acid with epicholorhydrin; or a polyglycicdylester obtained by reaction of a polycarboxylic acid such as phthalic acid and terephthalic acid with epichlorohydrin.

The curing agent is not particularly limited provided that a cured product can be formed by reaction with the epoxy resin, and a curing agent known in the art, such as an acid anhydride, aliphatic polyamine, aromatic polyamine, polyamide, polyphenol, polymercaptan, tertiary amine or Lewis acid complex can be used.

Among these, in combinations with the cycloaliphatic epoxy resin, an acid anhydride is preferably used as the curing agent. If an acid anhydride is used, compared to the case where an amine curing agent such as an aliphatic polyamine is used, the initial room temperature resistance of the thermistor can be lowered, and the change ratio of resistance value can be increased.

The acid anhydride may be for example hexahydrophthalic anhydride, methylhexahydrophthalic anhydride, tetra-hydrophthalic anhydride, methyl tetrahydrophthalic anhydride, phthalic anhydride, succinic anhydride, trimellitic anhydride, pyromellitic anhydride, methylnadic anhydride, maleic anhydride, anhydrous benzophenone tetra carboxylic acid, ethylene glycol bistrimellitate, glycerol tristrimellitate, endomethylene tetrahydrophthalic anhydride, methyl endomethylene tetrahydrophthalic anhydride, methylbutenyl tetrahydrophthalic anhydride, dodecyl succinic anhydride, methyl cyclohexene dicarboxylic acid anhydride, alkyl styrene-maleic anhydride copolymer, chlorendic anhydride, tetrabromine phthalic anhydride or polyazelaic acid anhydride.

For the purpose of further imparting flexibility to the cured product, an acid anhydride such as dodecyl succinic anhydride, polyadipic acid anhydride, polyazelaic acid anhydride, polysebacic acid anhydride, poly(ethyloctadecane diacid) anhydride, poly(phenylhexadecane diacid) anhydride, 2,4-diethyl glutaric anhydride, ethylene glycol bisanhydrotrimellitate and glycerol tristrimellitate may be used.

In the resin composition, these acid anhydrides may be used alone, or two or more can be used together.

The proportion of the curing agent in the resin composition is determined according to the epoxy resin and type of curing agent etc., but when using an an acid anhydride for example as the curing agent, it is preferably 0.5 to 1.5 and more preferably 0.8 to 1.2 in terms of the equivalence ratio to the epoxy groups in the epoxy resin. If the equivalence ratio of the curing agent is less than 0.5 or more than 1.5 relative to epoxy groups, unreacted epoxy groups and unreacted acid anhydride groups increase, so the mechanical strength of the thermistor body tends to fall and the change ratio of resistance value of the thermistor tends to decrease.

The electrically conducting particles are not particularly limited provided that they are particles which have electrical conductivity, for example carbon black, graphite, metal particles of various shapes or ceramic electrically conducting particles can be used. The metal particles may be of, for example, copper, aluminum, nickel, tungsten, molybdenum, silver, zinc, cobalt or nickel-plated copper powder. The ceramic electrically conducting particles may be of, for example, TiC or WC. These electrically conducting particles may be used alone, or two or more may be used together.

It is particularly preferred that the electrically conducting particles are metal particles. If metal particles are used as the electrically conducting particles, the change ratio of resistance value of the thermistor can be maintained sufficiently large, while room temperature resistance can be further reduced. This is convenient when the thermistor of the invention is used for example as an over-current protection element. Among metal particles, from the viewpoint of chemical stability such as being hard to oxidize, nickel particles are particularly preferred.

The shape of the electrically conducting particles is not particularly limited, but spheres, flakes, fibers or rods may be mentioned, and particles having spike-like projections on the particle surface are preferred. By using particles having spike-like projections, tunnel currents between adjacent particles flow more easily, so the change ratio of resistance value of the thermistor can be maintained sufficiently large, while room temperature resistance can be further reduced. Also, the distance between particle centers increases as compared with true spherical particles, so a still larger change ratio of resistance value can be obtained. Moreover, compared with the case where fibrous particles are used, scatter in the room temperature resistance of the thermistor can be reduced.

The electrically conducting particles having spike-like projections may form a powder wherein primary particles are individually dispersed, or preferably may form filamentous secondary particles wherein about 10 to 1000 primary particles are strung together in a chain. Preferably, the material thereof is metal, and more preferably, the main ingredient is nickel. The specific surface area is preferably 0.3 to 3.0 $m^2/g$, and the apparent density is preferably 3.0 $g/cm^3$ or less. Here, "specific surface area" means the specific surface area found by nitrogen gas adsorption based on the BET single point method.

The average particle diameter of the primary particles in the electrically conducting particles is preferably 0.1 to 7.0 μm, but more preferably 0.5 to 5.0 μm. Here, the average particle diameter of the primary particles is a value measured by the Fischer subsieve method.

The electrically conducting particles having spike-like projections which can be commercially obtained include for example "INCO Type 210", "INCO Type 255", "INCO Type 270" and "INCO Type 287" (all products of INCO Ltd.).

The ratio of the electrically conducting particles in the resin composition is preferably 5 to 90 mass %, but more preferably 60 to 80 mass %, based on the total resin composition. If the ratio of electrically conducting particles is less than 50 mass %, low room temperature resistance tends to be difficult to obtain, and if it is more than 90 mass %, a large change ratio of resistance value tends to be difficult to obtain.

A curing promoter may be further added to the resin composition to decrease the curing temperature and shorten the curing time. This curing promoter may be for example a tertiary amine, amine adduct, imidazole adduct, boric acid ester, Lewis acid, organometallic compound, organic acid metal salt or imidazole.

The resin composition, in addition to the aforesaid ingredients, more preferably contains polymer particles. By including polymer particles, scatter in the electrical properties of the obtained thermistor is suppressed, the change ratio of resistance value can be further increased, and thermal shock resistance is improved while maintaining a high heat resistance.

The effect of suppressing scatter in electrical properties is considered to be due to the fact that the flowability of the resin composition when the resin composition is heated to cure it is suppressed low, since the polymer particles swell up or dissolve. If the flowability of the heated resin composition is suppressed low, exudation of resin and sedimentation of electrically conducting particles in the curing process does not occur so easily. In the case of a cycloaliphatic epoxy resin, the viscosity is usually lower than in the case of an epoxy resin having an aromatic ring, such as a bisphenol A epoxy resin, so the flowability suppression by polymer particles is particularly effective.

By including the polymer particles, the expansion coefficient of the polymer layer tends to be increased, so the change ratio of resistance value can be farther increased.

Also, the cured product of the epoxy resin tends to be brittle compared with a thermoplastic resin generally, but by distributing the polymer particles, the toughness of the cured product is improved, and thermal shock resistance is improved while maintaining the high heat resistance of the thermosetting resin.

The polymer particles are not particularly limited provided that are miscible with the other components in the resin composition or swell up on heating so as to increase the viscosity of the resin composition or to make the resin composition gelate, but for example thermoplastic resin particles, core-shell polymer particles, rubber particles or thermosetting resin particles may be mentioned. Among these, thermoplastic resin particles or core-shell polymer particles are preferred.

The average particle diameter P1 of the polymer particles is preferably within the limits of 0.1 to 15 μm. The average particle diameter P1 of the polymer resin and average particle diameter P2 of the electrically conducting particles preferably satisfy the following relation (I):

$$0.1 <= (P1/P2) <= 10 \quad (I)$$

It is thought that, by arranging the average particle diameter of the polymer particles to lie within the aforesaid specific ranges, the electrical conduction path formed of electrically conducting particles is interrupted by the polymer particles less frequently, and the room temperature resistance can be reduced more certainly and easily.

The ratio of polymer particles is preferably 5 to 30 mass parts but more preferably 10 to 20 mass parts, relative to 100 mass parts of the epoxy resin. If this ratio is less than 5 mass parts, the effect of preventing exudation of the resin composition tends not to be easily obtained, and if it is more than 30 mass parts, the dispersibility of polymer particles tends to fall, or the room temperature resistance of the obtained thermistor tends to increase and its heat resistance tends to decrease.

If thermoplastic resin particles are used as the polymer particles, the thermoplastic resin forming the thermoplastic resin particles may for example be a polyolefin resin such as polyethylene or polypropylene, an acrylic resin, a vinyl chloride resin or a polyamide resin. In the case of a resin composition containing an epoxy resin, an acrylic resin, vinyl chloride resin or methacrylic resin is preferred in particular. To enhance miscibility with the epoxy resin, the thermoplastic resin particles are preferably chemically modified, for example by carboxyl groups.

As for the molecular weight of the thermoplastic resin, to efficiently increase the viscosity of the resin composition, the number average molecular weight is preferably 10000 to 10000000, but more preferably 100000 to 5000000.

The aforesaid thermoplastic resin particles may be obtained commercially. Commercial examples of acrylic resin particles include "Zeon acrylic resin F-301", "Zeon acrylic resin F-351", "Zeon acrylic resin F-320", "Zeon acrylic resin F-325", "Zeon acrylic resin F-340" and "Zeon acrylic resin F-345" (product names of Nippon Zeon Co., Ltd.). Commercial examples of vinyl chloride resin particles include "vinyl chloride G151", "vinyl chloride G351", "vinyl chloride G576" (product names of Nippon Zeon Co., Ltd.). Commercial examples of polyamide resin particles include "SUNMIDE#15", "SUNMIDE#15K-5", "SUNMIDE#HT-170" (product names of Sanwa Chemical Industries). These may be used alone, or two or more thereof may be used together.

The polymer particles may be core-shell polymer particles. Here, "core-shell polymer particle" means a particle having a multilayer structure comprising a core layer and a shell layer covering the core layer. However, it is not absolutely necessary that the core layer is completely covered by the shell layer, and part of the core layer may be exposed. The polymer which constitutes the core layer and the polymer which constitutes the shell layer may be covalently bonded.

The polymer of the shell layer of the core shell polymer particles is preferably a thermoplastic resin having a polar group. In this case, the polar group may be halogen, hydroxyl, amino, nitro, carboxyl, formyl, alkoxy, ester or nitrile. Among these, polar groups which do not react with the epoxy resin, such as halogen, ester or nitrile are preferred.

The core layer of the core-shell polymer particle is preferably softer, i.e., has a lower degree of hardness, than the shell layer. The hardness of the core layer and shell layer can be measured as scratching hardness, pressing hardness or rebound hardness at, for example, room temperature (25° C.). Alternatively, the elastic modulus of the core layer of the core-shell polymer particles is smaller than the elastic modulus of the shell layer of the core-shell polymer particles. The elastic modulus of the core layer and shell layer can be measured as, for example, bending elastic modulus, tensile elastic modulus or compression elastic modulus, for example at room temperature (25° C.). The hardness and elastic modulus can be compared by, for example, separately preparing the polymer which constitutes the core layer and the polymer which constitutes the shell layer, and comparing their hardnesses and elastic moduli.

The core-shell polymer particles comprise for example core layer of a thermoplastic resin which is rubber state at room temperature, and shell layer of a thermoplastic resin which is glass state at room temperature. These core-shell polymer particles comprise for example core layer particles of a polymer (including copolymer) having a glass transition temperature (Tg) of −20° C. or less, but preferably −30° C. or less, and shell layer particles of a polymer (including copolymer) having a glass transition temperature of 60° C. or more, but preferably 80° C. or more.

The polymer forming the core layer may specifically be a copolymer of a monomer such as a monofunctional (meth)acrylate compound comprising an alkoxy group having 4 to 8 carbon atoms, a di(meth)acrylate polyhydric alcohol (meth)acrylate compound such as ethylene glycol diacrylate or butylene glycol dimethylacrylate, or an aromatic divinyl compound such as divinylbenzene, with a bifunctional monomer having two functional groups with two different polymerization rates such as an allyl (meth)acrylate or diallyl maleate. This copolymer may be further polymerized with another monomer such as styrene or acrylonitrile.

The polymer forming the shell layer is a polymer of a monomer, e.g., an acrylate compound such as butyl acrylate, a methacrylate compound such as methyl methacrylate or t-butyl methacrylate, acrylonitrile or vinyl chloride, or copolymers thereof. This polymer may be further copolymerized with styrene, divinyltoluene or the like. It is particularly preferred that the monomer forming the shell layer polymer is an acrylate compound or a methacrylate compound.

In the core-shell polymer particles, the polymer in the core layer or the shell layer may be crosslinked. In this case, the crosslinking degree of the core layer is preferably higher than the crosslinking degree of the shell layer.

The aforesaid core-shell polymer particles can be obtained using a method known in the art, for example as disclosed in U.S. Pat. No. 4,419,496, European Patent No.

45,357, Japanese Patent Application Laid-Open No.S55-94917. Alternatively, they may be obtained commercially.

Core-shell polymer particles which can be obtained commercially include "PALALOID EXL-2655" (product name of Kureha Chemical Industry Co., Ltd.) which is a butadiene methacrylic acid alkyl styrene copolymer, "STAPHYLOID AC-3355", "STAPHYLOID TR-2105", "STAPHYLOID TR-2102", "STAPHYLOID TR-2122", "STAPHYLOID IM-101", "STAPHYLOID IM-203", "STAPHYLOID IM-301" AND "STAPHYLOID IM-401" (product names of Takeda Chemical Industries, Ltd.), "PALALOID EXL-2314" (product name of Kureha Chemical Industry Co., Ltd.), "PALALOID EXL-2611" and "PALALOID EXL-3387" (product names of Rohm & Haas Ltd.), and "Zeon Acrylic Resin F-351" (product name of Nippon Zeon Co., Ltd.) which are acrylic ester methacrylic ester copolymers, and "STAPHYLOID IM-601" (product name of Ganz Chemical, Inc.) which is an acrylic ester acrylonitrile styrene copolymer. These core shell polymers particles may be used alone, or two or more thereof may be used together.

The resin composition may also contain other ingredients if required, e.g., low molecular weight organic compounds such as for example waxes, fats, fatty acids or higher alcohols.

The thermistor 10 may be manufactured by a method comprising a layer-forming step of forming a laminate wherein a resin composition layer comprising the resin composition is formed on a first conductor foil, a lamination step of obtaining a sandwich product by laminating a second conductor foil or another laminate on the first laminate such that the resin composition layer is sandwiched by a pair of opposite conductor foils, a curing step wherein the resin composition is cured by heating the sandwich product, and a cutting step for obtaining a thermistor by cutting the sandwich product to a predetermined shape and size.

The resin composition used in the layer-forming step is obtained by mixing the aforesaid component ingredients using devices such as various stirrers, dispersing machines and mills. To reduce viscosity, an organic solvent such as an alcohol or acetone, or a solvent such as a reactive diluent, may be added to the resin composition to form a mixed solution, and the resin composition layer may be formed using this. The mixing time is not particularly limited, but the components can usually be uniformly dissolved or dispersed by mixing for 10 to 30 minutes. The mixing temperature also is not particularly limited, but is preferably 100 to 150° C. The resin composition after mixing or mixed solution is preferably degassed under vacuum in order to remove air bubbles mixed during mixing.

This resin composition or mixed solution is coated on the conductor foil so as to obtain the laminate wherein the resin composition layer is formed on one side of the conductor foil. When the mixed solution is used, it is preferred to heat the resin composition layer to remove the solvent. When the resin composition contains polymer particles, it is preferred to heat for a predetermined time at a predetermined temperature until the resin composition layer loses flowability due to swelling or dissolution of the polymer particles. In this case, the predetermined temperature and predetermined time may be suitably determined according to the type of curing agent and polymer particles, and their ratios. For example, it is preferred that the predetermined temperature is equal to or higher than the temperature at which the polymer particles swell or dissolve, and less than the temperature at which curing of the resin composition to be used starts. For example, in the case of a combination with core-shell polymer particles comprising an epoxy resin and an acrylate-methacrylate copolymer, it is preferred to heat at 80 to 120° C. for 30 seconds to 5 minutes.

Next, in the lamination step, the sandwich product is obtained by laminating the second conductor foil or another laminate on the resin composition layer so that the resin composition layer is sandwiched by a pair of opposite conductor foils. At this time, it is preferred to pressurize the whole so that the conductor foil and resin composition layer stick together.

In the curing step, the sandwich product is heated at a predetermined temperature for a predetermined time so that the resin composition is sufficiently cured. The heating conditions at this time may be suitably set according to the type of curing agent or the like. For example, when using an acid anhydride as the curing agent, curing usually proceeds sufficiently well by heating at 80 to 200° C. for 30 to 600 minutes. This curing step may be performed while pressurizing, and in this case, the aforesaid lamination step and curing step may be performed simultaneously.

In the cutting step, the thermistor 10 is obtained by cutting the sandwich product in which the resin composition is cured to a desired shape (for example, 3.6 mm×9 mm) by punching or the like. The punching can be performed by a method usually used to obtain a thermistor, such as a cat press.

A thermistor with leads may also be manufactured if required by joining leads respectively to the surfaces of the electrodes 2, 3 of conductor foil.

The thermistor 10, as substitute for the aforesaid manufacturing method, may be for example obtained by preparing a sheet of the cured product of the resin composition, and forming a conductor layer on both sides thereof. In this case, the sheet of cured product can be manufactured by curing the resin composition in a state where it is sandwiched between a pair of opposite supporting sheets having mold-release properties, and then peeling off the supporting sheets. In the case of this method, the conductor layer may be formed by for example metal plating, coating of metal paste, sputtering or vapor deposition.

EXAMPLES

Hereafter, this invention will be described more concretely referring to examples and comparative examples, but it should be understood that this invention is not to be construed as being limited to examples below.

Example 1

A resin composition was prepared using "E4080S" (product name of Asahi Denka Kogyo K.K., epoxy equivalents 210 g/eq.) which is an epoxy resin expressed by the aforesaid chemical formula (1a) as the cycloaliphatic epoxy resin, "B570" (product name of New Japan Chemical Co., acid anhydride equivalent 168 g/eq.) which is an acid anhydride curing agent as the curing agent, "PN-40J" (product name of Ajinomoto Fine Techno Co.) which is an epoxy resin amine adduct as the curing promoter, and "Type 255 nickel powder" (product name of INCO, average particle diameter 2.2-2.8 µm, apparent density 0.5-0.65 g/cm$^3$, specific surface area 0.68 m$^2$/g) which comprises filamentous nickel particles as the electrically conducting particles. Specifically, a mixture obtained by adding 64 mass parts of the curing agent B570 and 1 mass part of the curing promoter PN-40J to 100 mass parts of the cycloaliphatic epoxy resin E4080S was stirred with a stirrer, nickel particles were added to this mixture to 75 mass % based on the total resin composition including nickel particles, and stirred to obtain a resin composition in which nickel particles were dispersed.

Next, the obtained resin composition was coated on one side of a nickel foil to form a resin composition layer of thickness 0.5 mm, a nickel foil was laminated on this resin composition layer, and the whole heated at 130° C. in a 130° C. oven to cure the resin composition and obtain a sheet-shaped sandwich product.

This sheet-shaped sandwich product was punched out to obtain a thermistor having a parimary surface with an substantially rectangular shape measuring 3.6×9.0 mm. This thermistor comprises a pair of opposite electrodes of Ni foil, and a thermistor body which is the cured product of the aforesaid resin composition formed between these electrodes.

The obtained thermistor was heated in a thermostatic oven from room temperature to 200° C. at a rate of 3°/min, and was then cooled at the same rate. At this time, the resistance of the thermistor was measured by the 4 terminal method, and a temperature-resistance curve was obtained. From the obtained temperature-resistance curve, it was found that the initial (pre-heating) room temperature resistance value was $1.0 \times 10^{-3} \Omega$ (resistivity: $0.7 \times 10^{-2} \Omega cm$), and that the resistance increased rapidly near 130° C. to reach about $10^7$ times the room temperature resistance (i.e., the change ratio of resistance value is a factor of $10^7$). The room temperature resistance of the thermistor after the aforesaid heating and cooling was $2.0 \times 10^{-3} \Omega$ (resistivity: $1.3 \times 10^{-2} \Omega cm$), and remained at approximately the same level as the initial room temperature resistance.

To separately evaluate heat resistance, the thermistor obtained as described above was left at a high temperature of approximately 200° C., taken into an environment at room temperature, and its appearance was examined. No deformation due to the heat treatment was observed.

Example 2

A thermistor was obtained as in Example 1, except that "E4085S" having the structure expressed by the aforesaid chemical formula (1b) (product name of Asahi Denka Kogyo K.K., epoxy equivalents 145 g/eq.) was used as the cycloaliphatic epoxy resin, and the blending amount of the curing agent B570 was 93 mass parts.

For the obtained thermistor, from the temperature-resistance curve obtained in the same way as in Example 1, it was found that the initial room temperature resistance value was $2.0 \times 10^{-3} \Omega$ (resistivity: $1.3 \times 10^{-2} \Omega cm$), and that the change ratio of resistance value was a factor of $10^7$. The room temperature resistance of the thermistor after heating and cooling was $2.0 \times 10^{-3} \Omega$ (resistivity: $1.3 \times 10^{-2} \Omega cm$), and remained at approximately the same level as the initial room temperature resistance.

To separately evaluate heat resistance, the thermistor obtained as described above was left at a high temperature of approximately 200° C., taken into an environment at room temperature, and its appearance was examined. No deformation due to the heat treatment was observed.

Example 3

A thermistor was obtained as in Example 1, except that "E4088S" having the structure expressed by the aforesaid chemical formula (1c) (product name of Asahi Denka Kogyo K.K., epoxy equivalents 170 g/eq.) was used as the cycloaliphatic epoxy resin, and the blending amount of the curing agent B570 was 79 mass parts.

For the obtained thermistor, from the temperature-resistance curve obtained in the same way as in Example 1, it was found that the initial resistance value was $2.0 \times 10^{-3} \Omega$ (resistivity: $1.3 \times 10^{-2} \Omega cm$), and that the change ratio of resistance value was a factor of $10^6$. The room temperature resistance of the thermistor after heating and cooling was $3.0 \times 10^{-3} \Omega$ (resistivity: $1.9 \times 10^{-2} \Omega cm$), and remained at approximately the same level as the initial room temperature resistance.

To separately evaluate heat resistance, the thermistor obtained as described above was left at a high temperature of approximately 200° C., taken into an environment at room temperature, and its appearance was examined. No deformation due to the heat treatment was observed.

Example 4

A thermistor was obtained as in Example 1, except that "B002" which is an amino curing agent (product name of Japan Epoxy Resin Ltd.) was used as the cycloaliphatic epoxy resin, its blending amount was 50 mass parts, and the heating temperature for curing was 100° C.

For the obtained thermistor, from the temperature-resistance curve obtained in the same way as in Example 1, it was found that the initial resistance value was $4.0 \times 10^{-3} \Omega$ (resistivity: $2.6 \times 10^{-2} \Omega cm$), and that the change ratio of resistance value was a factor of $10^5$. The room temperature resistance of the thermistor after heating and cooling was $5.0 \times 10^{-3} \Omega$ (resistivity: $3.2 \times 10^{-2} \Omega cm$), and remained at approximately the same level as the initial room temperature resistance.

To separately evaluate heat resistance, the thermistor obtained as described above was left at a high temperature of approximately 200° C., taken into an environment at room temperature, and its appearance was examined. No deformation due to the heat treatment was observed.

Comparative Example 1

A thermistor was obtained as in Example 1, except that "EPICLON 850" which is a bisphenol A epoxy resin (product name of Dai Nippon Ink Chemical Co., epoxy equivalents 190 g/eq.) was used, and the blending amount of the curing agent was 88 mass parts.

For the obtained thermistor, from the temperature-resistance curve obtained in the same way as in Example 1, the initial room temperature resistance value was $2.0 \times 10^{-3} \Omega$ (resistivity: $1.3 \times 10^{-2} \Omega cm$), and the room temperature resistance after heating and cooling was $2.0 \times 10^{-3} \Omega$ (resistivity: $1.3 \times 10^{-2} \Omega cm$), but a sharp resistance variation due to temperature variation (PTC characteristics) was not found and the thermistor was thus not suitable for use.

Comparative Example 2

A thermistor was obtained as in Example 4, except that "EPICLON 850" which is a bisphenol A epoxy resin (product name of Dai Nippon Ink Chemical Co., epoxy equivalents 190 g/eq.) was used.

For the obtained thermistor, from the temperature-resistance curve obtained in the same way as in Example 1, the initial room temperature resistance value was $3.0 \times 10^{-3} \Omega$ (resistivity: $1.9 \times 10^{-2} \Omega cm$), the change ratio of resistance value was a factor of $10^2$, and the room temperature resistance after heating and cooling was $4.0 \times 10^{-1} \Omega$ (resistivity: $2.6 \Omega cm$).

TABLE 1

|  |  | Ex. 1 | Ex. 2 | Ex. 3 | Ex. 4 | Comp. Ex. 1 | Comp. Ex. 2 |
|---|---|---|---|---|---|---|---|
| Epoxy resin | E4080S | 100 | — | — | 100 | — | — |
|  | E4085S | — | 100 | — | — | — | — |
|  | E4088S | — | — | 100 | — | — | — |
|  | E850 | — | — | — | — | 100 | 100 |
| Curing agent | B570 | 64 | 93 | 79 | — | 88 | — |
|  | B002 | — | — | — | 50 | — | 50 |
| Ni particles (mass %) |  | 75 | 75 | 75 | 75 | 75 | 75 |
| RT Resistance value ($\Omega$) | Initial | $1.0 \times 10^{-3}$ | $2.0 \times 10^{-3}$ | $2.0 \times 10^{-3}$ | $4.0 \times 10^{-3}$ | $2.0 \times 10^{-3}$ | $3.0 \times 10^{-3}$ |
|  | After heating/cooling | $2.0 \times 10^{-3}$ | $2.0 \times 10^{-3}$ | $3.0 \times 10^{-3}$ | $5.0 \times 10^{-3}$ | $2.0 \times 10^{-3}$ | $4.0 \times 10^{-3}$ |
| RT Resistivity ($\Omega$cm) | Initial | $0.7 \times 10^{-2}$ | $1.3 \times 10^{-2}$ | $1.3 \times 10^{-2}$ | $2.6 \times 10^{-2}$ | $1.3 \times 10^{-2}$ | $1.9 \times 10^{-2}$ |
|  | After heating/cooling | $1.3 \times 10^{-2}$ | $1.3 \times 10^{-2}$ | $1.9 \times 10^{-2}$ | $3.2 \times 10^{-2}$ | $1.3 \times 10^{-2}$ | 2.6 |
| Change ratio of resistance |  | $10^7$ | $10^7$ | $10^6$ | $10^5$ | — | $10^2$ |

As shown in TABLE 1, in Examples 1-4, the initial room temperature resistance was low, the change ratio of resistance value was sufficiently large, and the room temperature resistance did not change much after heating/cooling. On the other hand, in Comparative Examples 1 and 2 which did not use a cycloaliphatic epoxy resin, although the initial resistance was relatively low, in Comparative Example 1 PTC characteristics were not observed, and in Comparative Example 2, the change ratio of resistance value remained at a very low level. In the case of Comparative Example 2, after heating/cooling, room temperature resistance increased greatly compared with the initial value, and from the viewpoint of operating stability, it was also poor. It was therefore found that the thermistor according to this invention had low room temperature resistance, a large change ratio of resistance value and excellent operating stability.

According to the present invention, there is provided a resin composition having a low room temperature resistance and high change ratio of resistance value, as well as superior operating stability.

What is claimed is:

1. A thermistor comprising:
   a pair of opposite electrodes; and
   a thermistor body positioned between the pair of electrodes,
   the thermistor body consists of a cured product of a resin composition comprising an epoxy resin including a cycloaliphatic epoxy resin wherein the cycloaliphatic epoxy resin has an epoxy group introduced as a glycidyl ether or a glycidyl ester; a curing agent; and electrically conducting particles.

2. A thermistor according to claim 1 wherein the cycloaliphatic epoxy resin contains a cycloaliphatic group with a saturated cycloaliphatic hydrocarbon group.

3. A thermistor according to claim 2, wherein the saturated cycloaliphatic hydrocarbon group has a cyclohexane ring or cyclopentane ring.

4. A thermistor according to claim 3, wherein the curing agent includes an acid anhydride.

5. A thermistor according to claim 2, wherein the curing agent includes an acid anhydride.

6. A thermistor according to claim 1, wherein the curing agent includes an acid anhydride.

* * * * *